(12) United States Patent
Zhou

(10) Patent No.: US 12,544,577 B2
(45) Date of Patent: Feb. 10, 2026

(54) INTRACARDIAC ELECTROGRAM-BASED DIFFERENTIATION OF CONDUCTION SYSTEM AND MYOCARDIAL PACING

(71) Applicant: Medtronic, Inc., Minneapolis, MN (US)

(72) Inventor: Xiaohong Zhou, Woodbury, MN (US)

(73) Assignee: Medtronic, Inc., Minneapolis, MN (US)

( * ) Notice: Subject to any disclaimer, the term of this patent is extended or adjusted under 35 U.S.C. 154(b) by 635 days.

(21) Appl. No.: 17/856,046

(22) Filed: Jul. 1, 2022

(65) Prior Publication Data

US 2023/0060821 A1    Mar. 2, 2023

Related U.S. Application Data

(60) Provisional application No. 63/237,951, filed on Aug. 27, 2021.

(51) Int. Cl.
*A61N 1/365* (2006.01)
*A61N 1/05* (2006.01)

(52) U.S. Cl.
CPC ............. *A61N 1/365* (2013.01); *A61N 1/056* (2013.01)

(58) Field of Classification Search
None
See application file for complete search history.

(56) References Cited

U.S. PATENT DOCUMENTS

| | | | |
|---|---|---|---|
| 6,760,619 B1 | 7/2004 | Helland et al. | |
| 8,010,191 B2 | 8/2011 | Zhu et al. | |
| 8,565,880 B2 | 10/2013 | Dong et al. | |
| 10,773,086 B2 | 9/2020 | Sheldon et al. | |
| 10,799,703 B2 | 10/2020 | Ghosh et al. | |
| 10,842,999 B2 | 11/2020 | Ghosh | |
| 11,052,255 B2 | 7/2021 | Brisben et al. | |
| 2009/0149904 A1 | 6/2009 | Perschbacher et al. | |
| 2018/0326215 A1 | 11/2018 | Ghosh | |
| 2019/0111270 A1* | 4/2019 | Zhou | A61N 1/36507 |
| 2020/0129772 A1 | 4/2020 | Casavant et al. | |
| 2020/0261731 A1* | 8/2020 | Ghosh | A61N 1/3627 |
| 2020/0352470 A1 | 11/2020 | Ghosh | |
| 2020/0353265 A1 | 11/2020 | Ghosh et al. | |
| 2020/0406041 A1 | 12/2020 | Cao et al. | |
| 2022/0032071 A1* | 2/2022 | Sharma | A61N 1/0565 |

FOREIGN PATENT DOCUMENTS

WO    2011099992 A1    8/2011

OTHER PUBLICATIONS (PCT/IB2022/057247) PCT Notification of Transmittal of the International Search Report and the Written Opinion of the International Searching Authority, dated Oct. 19, 2022, 14 pages.

* cited by examiner

*Primary Examiner* — Erica S Lee
(74) *Attorney, Agent, or Firm* — Shumaker & Sieffert, P.A.

(57) ABSTRACT

In some examples, a method comprises sensing one or more left-ventricular activations via one or more electrodes of a left-ventricular lead, wherein each of the one or more left-ventricular activations are in response to delivery of an electrical stimulation to a heart of a patient; determining one or more left-ventricular activation metrics based on the sensed one or more left-ventricular activations; and determining whether the electrical stimulation provided conduction system pacing based on the one or more ventricular activation metrics.

20 Claims, 9 Drawing Sheets

INTRACARDIAC ELECTROGRAM-BASED DIFFERENTIATION OF CONDUCTION SYSTEM AND MYOCARDIAL PACING

RELATED APPLICATIONS

The present application claims the benefit of U.S. Provisional Application No. 63/237,951, filed Aug. 27, 2021, which is incorporated herein by reference in its entirety.

TECHNICAL FIELD

The disclosure relates generally to medical device systems and, more particularly, medical device systems configured for cardiac pacing. The disclosure relates generally to medical device systems and, more particularly, medical device systems configured for cardiac pacing.

BACKGROUND

Some types of implantable medical devices (IMDs), such as cardiac pacemakers or implantable cardioverter defibrillators, may be used to provide cardiac therapy to a patient via one or more electrodes. The cardiac therapy may be delivered to the heart in the form of pulses or shocks for pacing, cardioversion or defibrillation, or cardiac resynchronization therapy (CRT). CRT may help enhance cardiac output by resynchronizing the electromechanical activity of the ventricles of the heart in patients with conditions such as ventricular dyssynchrony. Some IMDs may sense intrinsic depolarizations of the heart and control the delivery of CRT to the heart based on the sensed intrinsic depolarizations.

Conduction system pacing (CSP) is a technology that uses the heart's native conduction system to provide paced depolarizations and resulting contractions that better mimic intrinsic depolarizations and contractions, which may improve the health and pumping efficiency of the heart. Example types of conduction system pacing include His bundle pacing, left bundle branch pacing (LBBP), right bundle branch pacing (RBBP), and bilateral bundle branch pacing (BBBP). Example locations from which the conduction system may be accessed include the intraventricular septum via the right ventricle, and the atrioventricular septum via the right atrium, e.g., at the area of the triangle of Koch. In some examples, CSP may provide cardiac resynchronization without requiring delivery of cardiac pacing to the left side of the heart.

SUMMARY

CSP, such as LBBP, is a recently-introduced novel physiological pacing modality. However, it is challenging to confirm successful LBBP, and CSP more generally, during implantation and post-implantation. Unsuccessful CSP may result in myocardial pacing. Left bundle branch area pacing, for example, can result in LBBP or left-ventricular septal pacing (LVSP).

In general, this disclosure is directed to techniques for determining whether electrical stimulation has achieved CSP, or instead resulted in less efficacious myocardial pacing. The techniques include sensing one or more left-ventricular activations via one or more electrodes of a left-ventricular lead. The one or more left-ventricular activations occur in response to delivery of an electrical stimulation to a heart of a patient that is intended to provide CSP. One or more features of the activations, such as their timing and/or morphology, may vary based on whether they result from CSP or myocardial pacing. The techniques may include determining one or more left-ventricular activation metrics indicative of such features based on the sensed one or more left-ventricular activations, and determining whether the electrical stimulation provided CSP based on the one or more ventricular activation metrics.

Determining whether an electrical stimulation resulted in CSP according to the techniques described herein may provide advantages. For example, the techniques described herein may allow loss of CSP to be identified, and a magnitude of the electrical stimulation to be adjusted to regain capture of the conduction system, or may allow a medical device system to transition to providing CRT if CSP cannot be achieved. During implantation of a medical device system, the techniques described herein may provide feedback to facilitate placement of an electrode used to deliver CSP.

This summary is intended to provide an overview of the subject matter described in this disclosure. It is not intended to provide an exclusive or exhaustive explanation of the apparatus and methods described in detail within the accompanying drawings and description below. The details of one or more aspects of the disclosure are set forth in the accompanying drawings and the description below.

DETAILED DESCRIPTION

In general, this disclosure describes example techniques related to conduction system pacing (CSP). CSP is a technique in which one or more pacemaker devices use the heart's native electrical conduction system to conduct electrical signals that cause depolarization of heart muscles, which ultimately causes synchronous contraction of the ventricles. In this manner, CSP may provide benefits associated with cardiac resynchronization therapy (CRT). A system may provide different types of CSP depending upon which portion of the heart's native electrical conduction system are targeted with electrical stimulation. Examples of CSP include left bundle branch pacing (LBBP), right bundle branch pacing (RBBP), bilateral bundle branch pacing (BBBP), His bundle pacing (HBP), and the like.

Figure 1:
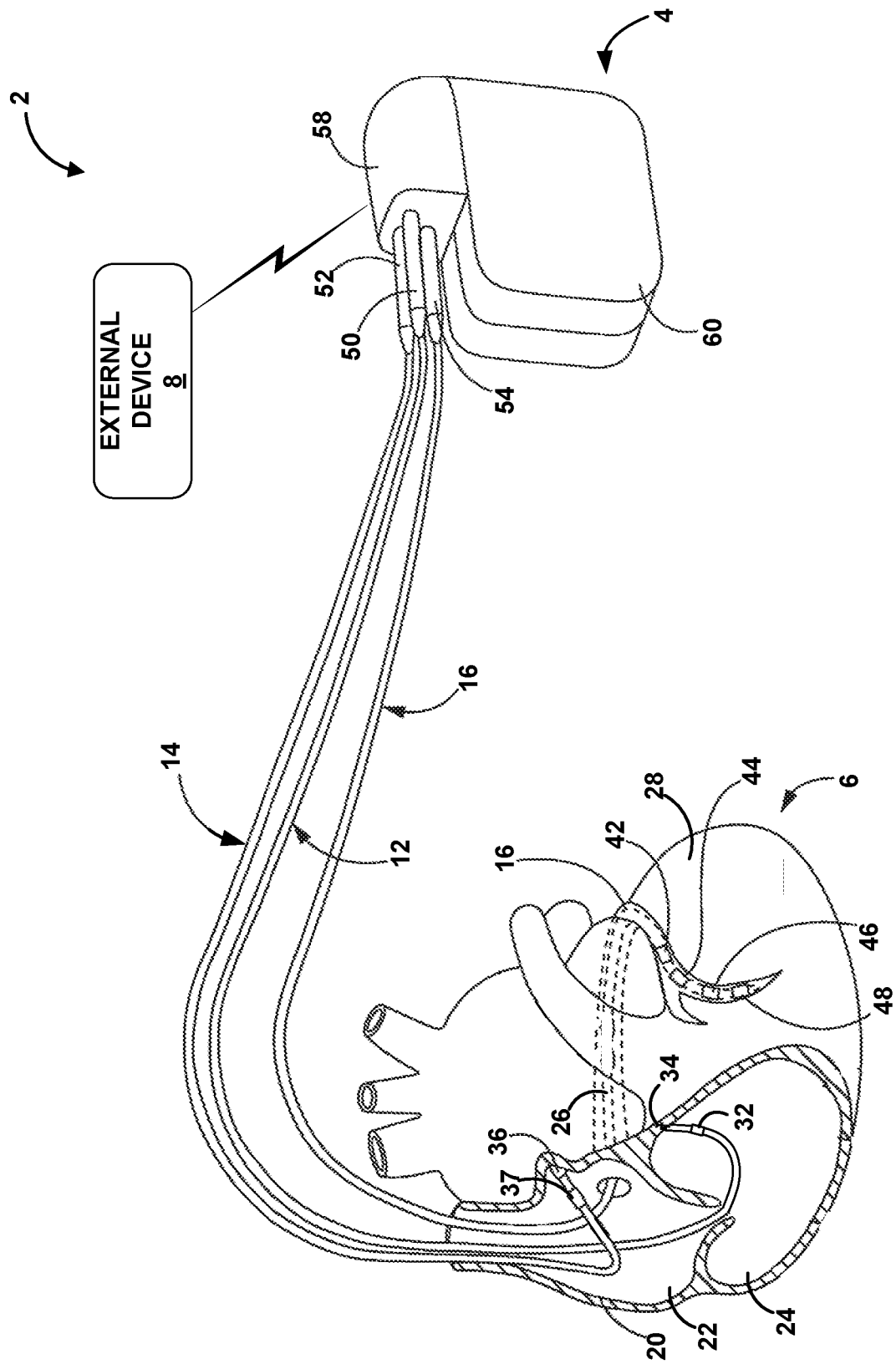
FIG. 1 is a conceptual drawing illustrating an example of a medical device system including an implantable medical device and an external device in conjunction with a heart of a patient.
Figure 2:
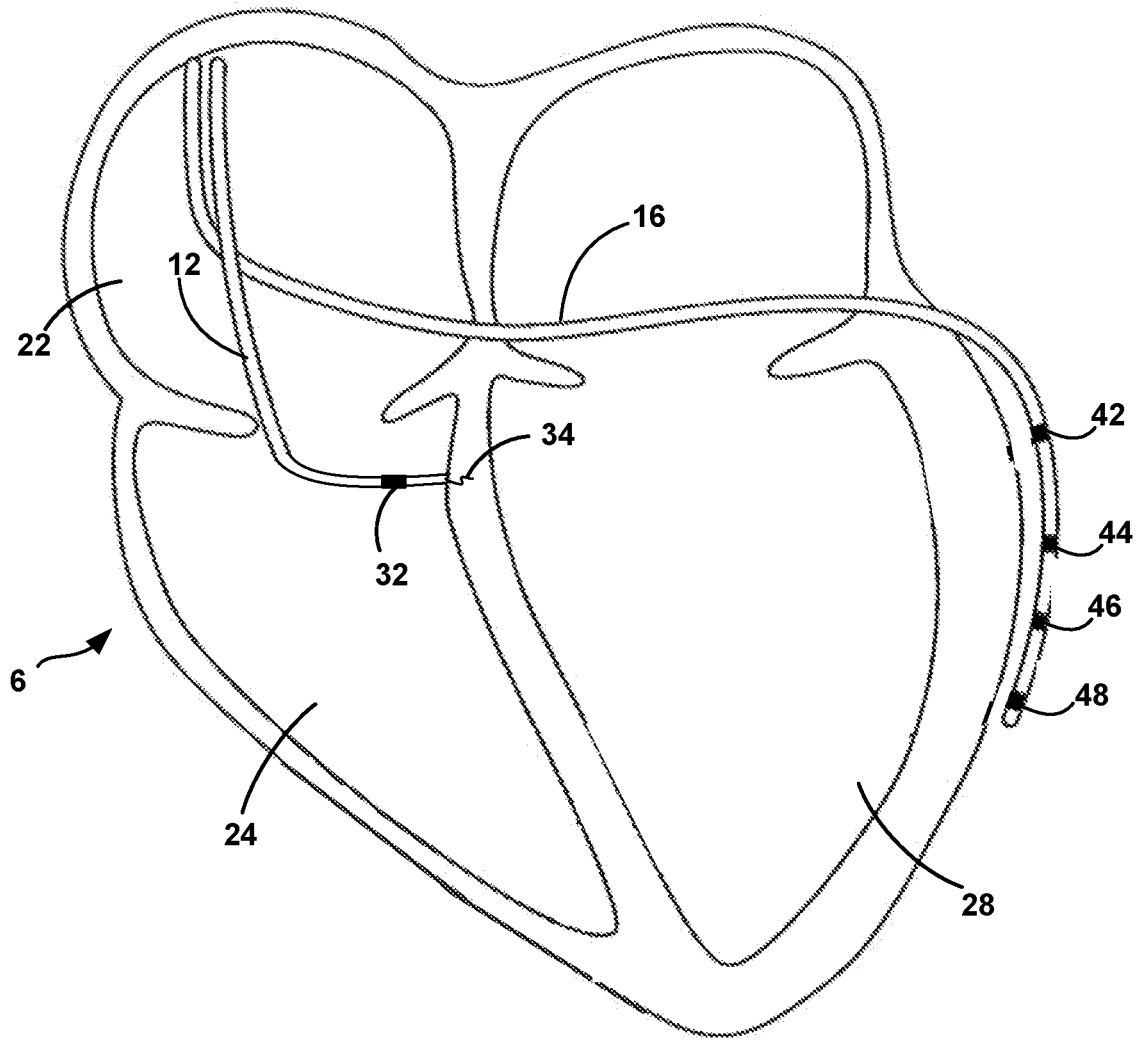
FIG. 2 is a conceptual drawing illustrating portions of the medical device system of FIG. 1 in conjunction with the heart of the patient.

FIG. 1 is a conceptual drawing illustrating an example of a medical device system 2 including an implantable medical device (IMD) 4) and an external device 8 in conjunction with a heart 6 of a patient. FIG. 2 is a conceptual drawing further illustrating portions of medical device system 2 in conjunction with heart 6. Medical device system 2 is an example of a medical device system configured to implement the example techniques described herein for differentiating between CSP and myocardial pacing based on left-ventricular activations sensed via a left-ventricular lead such as a coronary sinus lead placed in the cardiac vein.

In some examples, IMD 4 may be an implanted, multi-channel cardiac pacemaker, implantable cardioverter-defibrillator (ICD), implantable pulse generator (IPG), leadless (e.g., intracardiac) pacemaker, extravascular pacemaker and/or ICD, or other IMD or combination of such IMDs configured to deliver CSP to heart 6. In some examples, IMD 4 may be configured to sense electrical signals corresponding to the depolarization and repolarization of heart 6, e.g., a cardiac electrogram (EGM), via electrodes on one or more leads 12, 14, and 16 or the housing of IMD 4. Additionally, or alternatively, IMD 4 may sense electrical signals corresponding to the depolarization and repolarization of heart 6 via extravascular electrodes (e.g., electrodes positioned outside the vasculature of the patient), such as epicardial electrodes, external surface electrodes, subcutaneous electrodes, and the like. In any such examples, the configurations of electrodes used by IMD 4 for sensing and pacing may be unipolar or bipolar. In some examples, IMD 4 may determine heart rate to, e.g., detect arrhythmia, based on the electrical signals sensed via the electrodes. IMD 4 may also deliver therapy in the form of electrical signals to heart 6 via electrodes located on one or more leads 12, 14, and 16 or a housing of IMD 4. In the illustrated example, IMD 4 is connected to leads 12, 14 and 16, and may be communicatively coupled to external device 8.

Leads 12, 14, and 16 extend into heart 6 of the patient to sense electrical activity of heart 6 and to deliver electrical stimulation to heart 6. In the example shown in FIG. 1, RV lead 12 extends through one or more veins (not shown), vena cava 20, RA 22, and into RV 24 for sensing right ventricular cardiac signals and delivering CSP, e.g., LBBP. A distal end of RV lead 12 is positioned at the intraventricular septum between RV 24 and LV 28 via RV 24 for delivery of CSP. Electrode 34 of RV lead 12 may extend into the intraventricular septum to facilitate capture of the conduction system with electrical stimulation delivered via electrode 34. An electrode used to deliver CSP may be positioned in other locations, such as the atrioventricular septum, in other examples. In some examples, system 2 may include one or more leadless pacing devices configured to deliver CSP, e.g., instead of one or more of leads 12, 14, and 16.

Right atrial (RA) lead 14 extends through one or more veins and vena cava 20 and is positioned such that a distal end of RA lead 14 is in the vicinity of RA 22 and vena cava 20 for sensing right atrial cardiac signals and delivering therapeutic signals to RA 22. LV lead 16 extends through one or more veins, vena cava 20, RA 22, and into coronary sinus 26 (illustrated in phantom) to a region adjacent to the free wall of LV 28 of heart 6 for sensing left-ventricular cardiac signals and delivering therapeutic signals to LV 28. In some examples, LV lead 16 may also be referred to as a coronary sinus (CS) lead.

In the illustrated example, lead 12 includes bipolar electrodes 32 and 34, which may be located adjacent to a distal end of lead 12. Lead 14 includes bipolar electrodes 36 and 37, which may be located adjacent to a distal end of lead 14. Lead 16 may be a multipolar LV lead and may include electrodes 42, 44, 46, and 48. In some examples, electrodes 42, 44, 46, and 48 may be located adjacent to a distal end of lead 16, as illustrated in FIGS. 1 and 2.

Electrodes 34 and/or 36 may be extendable helix tip electrodes and may be mounted retractably within respective insulative electrode heads. In some examples, electrodes 32-48 of leads 12, 14, and 16 may be electrically coupled to a respective conductor within a lead body of a corresponding one of leads 12, 14, and 16, and thereby coupled to circuitry within IMD 4. In some examples, leads 12, 14, and 16 respectively include in-line connectors 50, 52, and 54. IMD 4 may further include a connector block 58 and a hermetically-sealed housing 60. In-line connectors 50, 52, and 54 may be configured to fit into corresponding bipolar bores of connector block 58, which may be coupled to electrically insulated conductors within leads 12, 14, and 16, thereby connecting electrodes-48 to IMD 4.

In some examples, one or more outward-facing portions of housing 60 may be uninsulated, and thus may enable housing 60 to be used as a housing electrode. In some examples, substantially all of housing 60 may be uninsulated, such that substantially all of housing 60 defines the housing electrode. In some other examples, housing 60 may define one or more additional housing electrodes (not shown), which may be defined by corresponding divisions between insulated and uninsulated portions of housing 60. In some examples, IMD 4 may be configured for bipolar sensing of electrical signals corresponding to a cardiac electrogram of heart 6 via any bipolar combination of electrodes 32-48. In other examples, IMD 4 may be configured for unipolar sensing of electrical signals corresponding to a cardiac electrogram of heart 6 via any one of electrodes 32-48 in combination with housing electrode 60.

In some examples, medical device system 2 may include extravascular electrodes, such as subcutaneous electrodes, substernal electrodes, epicardial electrodes, and/or patch electrodes, instead of or in addition to the electrodes of leads 12, 14, and 16 illustrated in FIG. 1. In some other examples, a medical device configured to deliver cardiac therapy may not necessarily be implanted in the patient. In some such examples, a medical device may deliver pacing and other therapies to heart 6 via percutaneous leads that extend through the skin of the patient to one or more locations within or outside of heart 6.

In some other examples, medical device system 2 may include any suitable number of leads coupled to IMD 4 and extending to any suitable location within or proximate to heart 6. For example, medical device system 2 may include a dual-chamber IMD instead of a three-chamber IMD such as IMD 4. In one example of a dual chamber configuration, IMD 4 is connected to leads 12 and 16.

Instead of or in addition to IMD 4, medical device system 2 may include one or more leadless (e.g., intracardiac) pacing devices (LPDs). In such examples, the one or more LPDs may include therapy delivery circuitry and processing circuitry within a housing configured for implantation on or within one of the chambers of heart 6. In such systems, the one or more pacing devices, which may include one or more LPDs and/or an IMD coupled to one or more leads, may communicate to coordinate sensing and pacing in various chambers of heart 6 to provide CSP and CRT according to the techniques described herein.

External device 8 may be a computing device (e.g., used in a home, ambulatory, clinic, or hospital setting) to communicate with ICM 10 via wireless telemetry. External device 8 may include or be coupled to a remote patient monitoring system, such as Carelink®, available from Medtronic plc, of Dublin, Ireland. External device 8 may be, as an example, a programmer, external monitor, or a consumer device (e.g., tablet or smart phone). In some examples, external device 8 may receive data, alerts, patient physiological information, or other information from IMD 4.

In some examples, external device 8 may be used to program commands or operating parameters into IMD 4 for controlling its functioning (e.g., when configured as a programmer for IMD 4). External device 8 may be used to interrogate IMD 4 to retrieve data, including device operational data as well as physiological data accumulated in IMD memory. The interrogation may be automatic, such as according to a schedule, or in response to a remote or local user command. Programmers, external monitors, and consumer devices are examples of external devices 18 that may be used to interrogate IMD 4. Examples of communication techniques used by IMD 4 and external device 8 include radiofrequency (RF) telemetry, which may be an RF link established via Bluetooth, WiFi, or medical implant communication service (MICS). In some examples, external device 8 includes processing circuitry. The processing circuitry of external device 8 may be configured to perform any of the techniques described with respect to processing circuitry of medical device system 2, such as described further herein.

Figure 3:
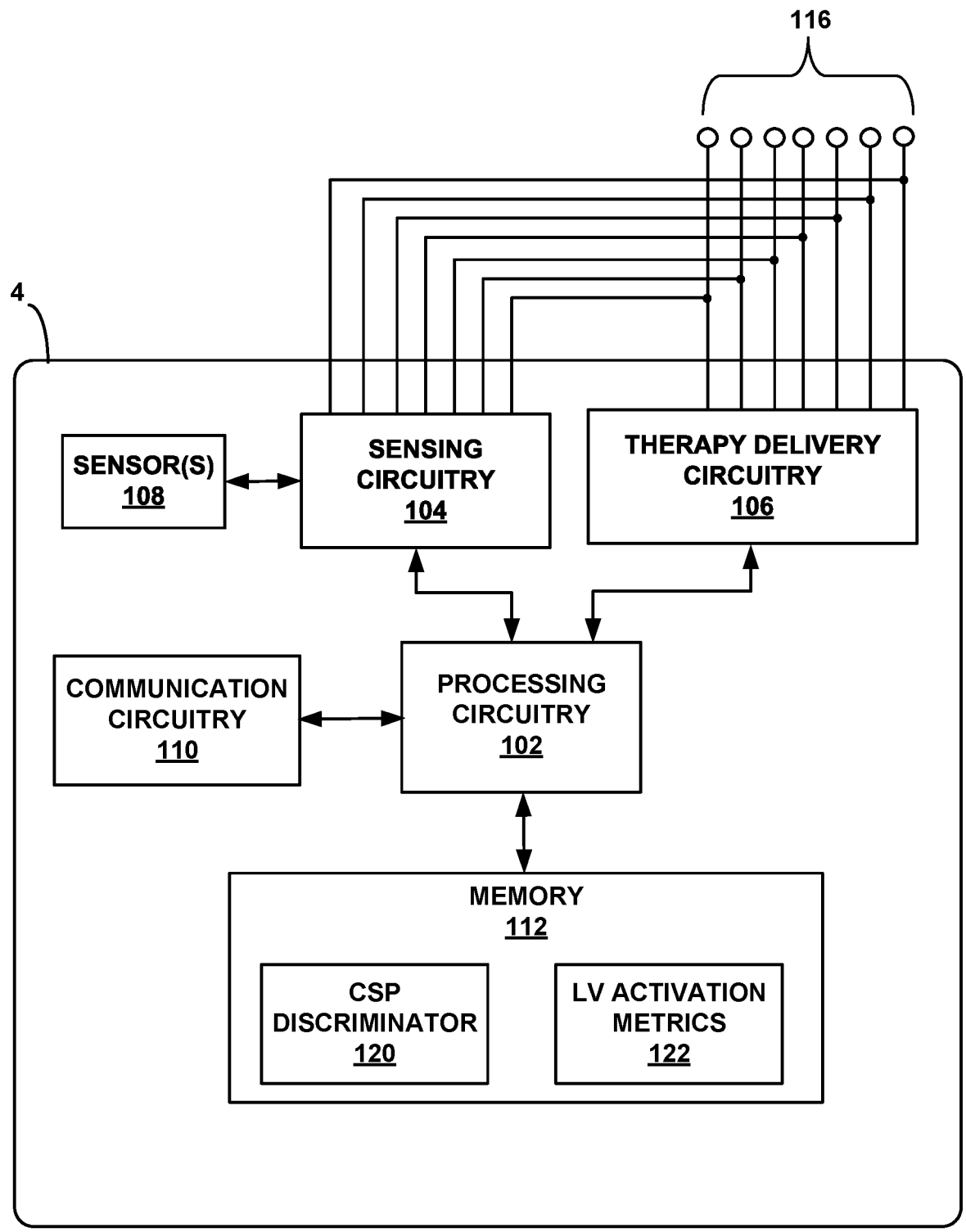
FIG. 3 is a functional block diagram illustrating an example configuration of the example implantable medical device of FIG. 1.

FIG. 3 is a functional block diagram illustrating an example configuration of IMD 4. As shown in FIG. 3, IMD 4 includes processing circuitry 102, sensing circuitry 104, therapy delivery circuitry 106, sensors 108, communication circuitry 110, and memory 112. In addition, IMD 4 is coupled to one or more electrodes 116, which may be any one or more of the previously-described electrodes of medical system 2, and one or more of which may be disposed on housing 60 of IMD 4 or carried by one or more of leads 12, 14, and/or 16 connected to IMD 4. In some examples, memory 112 includes computer-readable instructions that, when executed by processing circuitry 102, cause IMD 4 and processing circuitry 102 to perform various functions attributed to IMD 4 and processing circuitry 102 herein. Memory 112 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Processing circuitry 102 may include fixed function circuitry and/or programmable processing circuitry. Processing circuitry 102 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 102 may include multiple components, such as any combination of one or more microprocessors, one or more controllers, one or more DSPs, one or more ASICs, or one or more FPGAs, as well as other discrete or integrated logic circuitry. The functions attributed to processing circuitry 102 herein may be embodied as software, firmware, hardware or any combination thereof.

Sensing circuitry 104 and therapy delivery circuitry 106 may be selectively coupled to electrodes 116, e.g., via switching circuitry (not shown) as controlled by processing circuitry 102. The switching circuitry may include one or more transistors or other circuitry for selectively coupling electrodes 116 to circuitry of IMD 4. Sensing circuitry 104 may monitor signals from electrodes 116, e.g., intracardiac electrograms (EGMs) in order to monitor electrical activity of heart (e.g., to detect depolarizations for heart rate determination and/or to sense LV activations for determining whether electrical stimulation resulted in CSP). Sensing circuity 104 may also monitor signals from one or more other sensor(s) 108, such as to determine an activity level or activity of the patient. In some examples, sensors 108 may be one or more accelerometers e.g., one or more three-axis accelerometers), one or more temperature sensors, or one or more other sensors configured to sense physical parameters of the patient. Signals generated by such sensors may be indicative of physical parameters of the patient, such as gross body movement, posture, exertion, temperature, activity level, or other physical parameters. Sensing circuitry 104 may monitor signals from electrodes 116 and sensors 108. In some examples, sensing circuitry 104 may include one or more filters and amplifiers for filtering and amplifying signals received from one or more of electrodes 116 and/or the one or more of sensor(s) 108. Sensing circuitry 104 may also include rectification circuitry, sample-and-hold circuitry, one or more comparators, and/or analog-to-digital conversion circuitry. The functionality provided by such circuitry may be applied to the signal in the analog or digital domain.

Therapy delivery circuitry 106 may include circuitry for generating a signal, such as one or more capacitors, charge pumps, and/or current sources, as well as circuitry for selectively coupling the signal to electrodes 116, e.g., transistors or other switching circuitry. Therapy delivery circuitry 106 may be configured to deliver pacing pulses or other therapeutic stimulation signals. As will be described in greater detail below, processing circuitry 102 may be configured to control therapy delivery circuitry 106 to deliver CSP and/or CRT via selected combinations of electrodes 116.

Communication circuitry 110 may include any suitable hardware, firmware, software, or any combination thereof for communicating with another device, such as external device 8, or another IMD or sensor. For example, communication circuitry 110 may include voltage regulators, current generators, oscillators, or circuitry for generating a signal, resistors, capacitors, inductors, and other filtering circuitry for processing received signal, as well as circuitry for modulating and/or demodulating a signal according to a communication protocol. Communication circuitry 110 may also include transistors or other switching circuitry for selectively coupling transmitted signal to or receiving signals from an antenna of IMD 4 (not shown) or electrodes 116. Under the control of processing circuitry 102, communication circuitry 110 may receive downlink telemetry from, as well as send uplink telemetry to, external device 8 or another device. The patient, a clinician, or another user may retrieve data from IMD 4 using external device 8, or by using another local or networked computing device (e.g., a remote computer located with the clinician) configured to communicate with processing circuitry 102 via communication circuitry 110. In some examples, the clinician may also program parameters of IMD 4 using external device 8.

IMD 4 is an example of a device configured to determine whether electrical stimulation has achieved CSP, e.g., LBBB, or instead resulted in less efficacious myocardial pacing, e.g., LVSP. Therapy delivery circuitry 106 is configured to deliver electrical stimulation configured to provide CSP, e.g., via electrode 34 (FIGS. 1 and 2). Processing circuitry 102 is configured to execute CSP discriminator 120 to determine whether the electrical stimulation resulted in CSP or myocardial pacing.

Executing CSP discriminator 120, processing circuitry 102 is configured to control sensing circuitry 104 to sense one or more EGMs, to sense left-ventricular activations resulting from the electrical stimulation, via one or more of electrodes 42, 44, 46, and 48 of LV lead 16. Processing circuitry 102 is configured to determine one or more left-ventricular activation metrics 122 based on the sensed one or more left-ventricular activations. Processing circuitry 102 determines whether the electrical stimulation provided CSP, e.g., LBBB, based on the one or more ventricular activation metrics. Further examples of techniques for discriminating between CSP and myocardial pacing are described with reference to FIGS. 5A-9.

Figure 4:
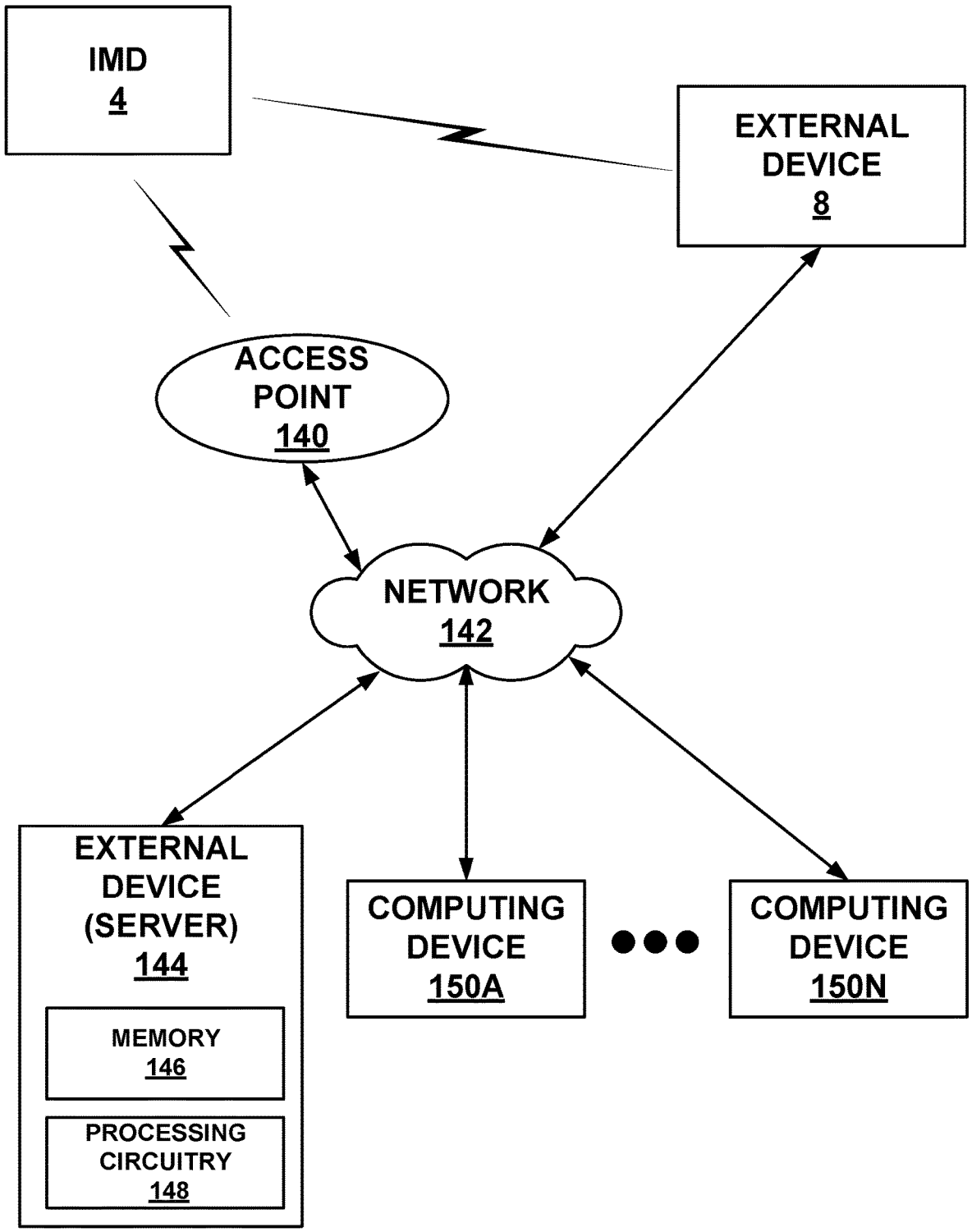
FIG. 4 is a functional block diagram illustrating an example system that includes an external device, such as a server, and one or more computing devices that are coupled to the implantable medical device and the external device of FIG. 1 via a network.

FIG. 4 is a functional block diagram illustrating an example system that includes an access point 140, a network 142, external computing devices, such as an external device (server) 144, which may include a memory 146 and/or processing circuitry 148, and one or more other computing devices 150A-150N, which may be coupled to IMD 4 and external device 8 via network 142. In this example, IMD 4 may use communication circuitry 110 to communicate with external device 8 via a first wireless connection, and to communicate with an access point 140 via a second wireless connection. In the example of FIG. 4, access point 140, external device 8, server 144, and computing devices 150A-150N are interconnected and may communicate with each other through network 142.

Access point 140 may comprise a device that connects to network 142 via any of a variety of connections, such as telephone dial-up, digital subscriber line (DSL), or cable modem, or other suitable connections. In other examples, access point 140 may be coupled to network 142 through different forms of connections, including wired or wireless connections. In some examples, access point 140 may be a user device, such as a tablet or smartphone, that may be co-located with the patient. As discussed above, IMD 4 may be configured to transmit data, such as current values and heart failure statuses, to external device 8. In addition, access point 140 may interrogate IMD 4, such as periodically or in response to a command from the patient, a clinician, or network 142, in order to retrieve data pertaining to one or more of patient parameters, delivery of therapy, or other information stored in memory 112 (FIG. 3) of IMD 4. Access point 140 may then communicate the retrieved data to server 144 via network 142.

In some cases, memory 146 of server 144 may be configured to provide a secure storage site for data collected from IMD 4 and/or external device 8. In some cases, server 144 may assemble data in web pages or other documents for viewing by trained professionals, such as clinicians, via computing devices 150A-150N. One or more aspects of the illustrated system of FIG. 4 may be implemented with general network technology and functionality, which may include or be similar to that provided by the Medtronic CareLink® Network developed by Medtronic plc, of Dublin, Ireland. In some examples, such network technology and functionality may enhance the security of the communications transmitted between the components of FIG. 4, such as the communications transmitted from external device 8 to IMD 4. For example, the network technology and functionality may validate a communication, such as patient or clinician input, transmitted from a device purporting to be external device 8 and directed toward IMD 4, by confirming the identity of the device purporting to be external device 8. In other examples, the network technology and functionality similarly may validate a communication transmitted from another device, such as a device purporting to be one or more of computing devices 150A-150N (e.g., a purported remoter computer located with a clinician) toward IMD 4. In some examples, such security features may protect the cardiac pacing delivered by IMD 4 to the patient from being disrupted, hacked, or otherwise altered by communications originating from unauthorized sources. In some examples, one or more of computing devices 150A-150N (e.g., device 150A) may be a remote computer, such as a smartphone, tablet or other smart device located with a clinician, by which the clinician may program, receive alerts from, and/or interrogate IMD 4.

Figure 5A:
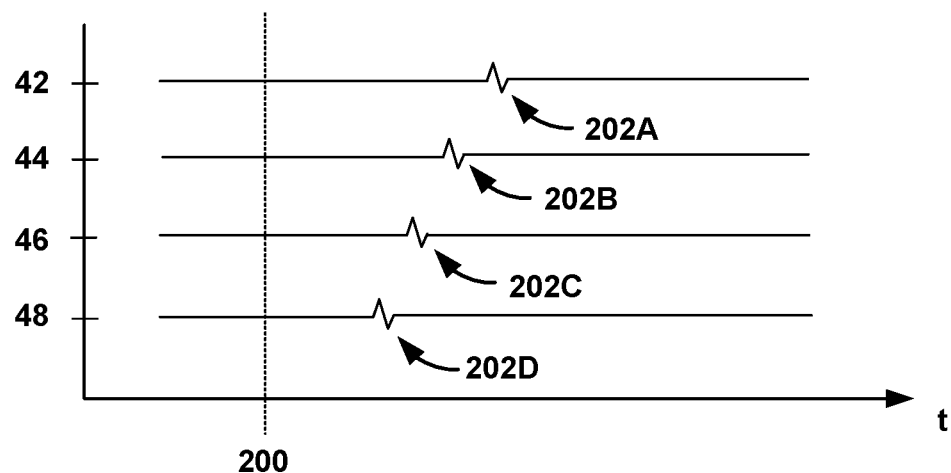
FIGS. 5A-5C are timing diagrams illustrating sensing of left-ventricular activation via electrodes of a left-ventricular lead.
Figure 5B:
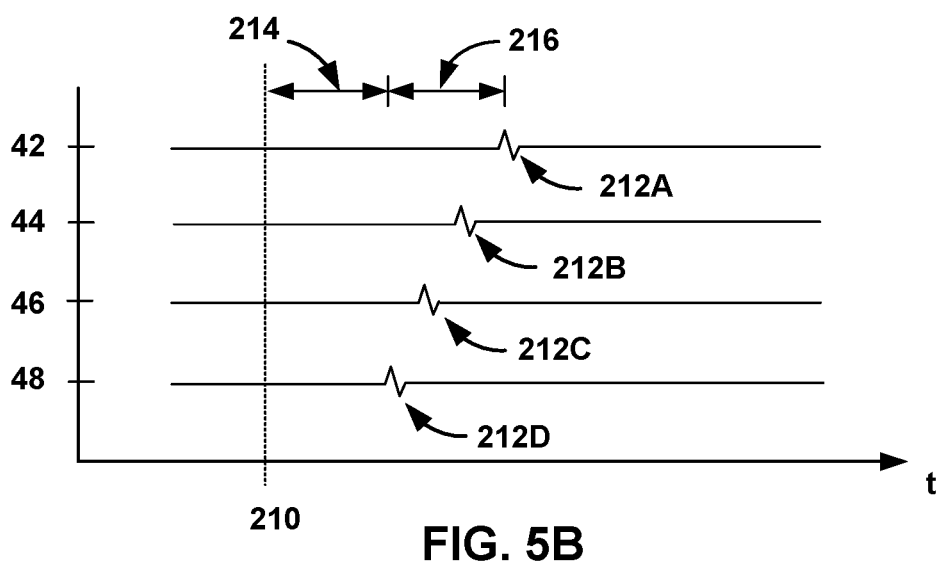
Figure 5C:
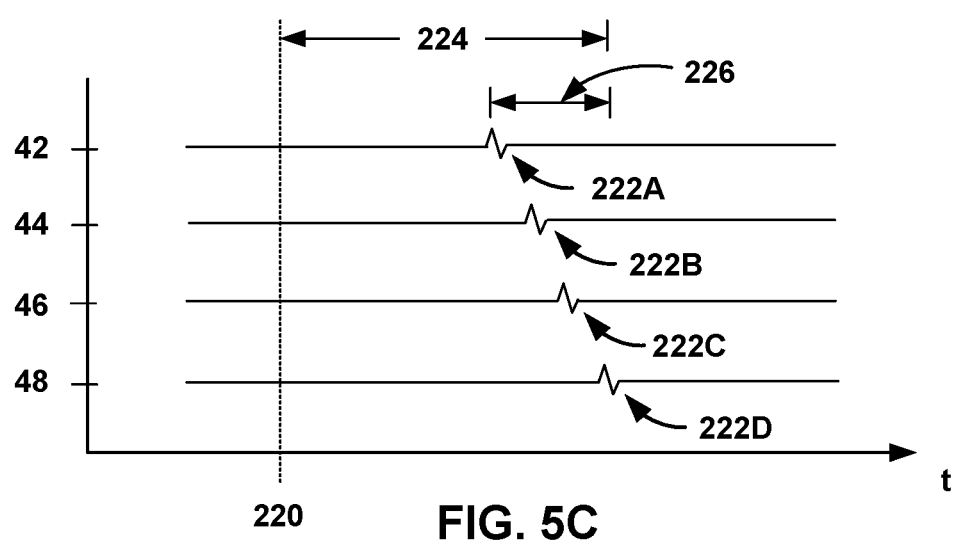

FIGS. 5A-5C are timing diagrams illustrating respective sensing of left-ventricular activation via each of electrodes 42, 44, 46, and 48 of LV lead 16. In particular, FIG. 5A illustrates a temporal pattern of left-ventricular activations 202A-202D (collectively "left-ventricular activations 202") in response to intrinsic depolarization 200 during sinus rhythm. As shown in FIG. 5A, during sinus rhythm, the time sequence of left-ventricular activations 202 is from distal-most electrode 48, which may be located on the LV free wall, to proximal-most electrode 42, which may be located posteriorly on the LV. This timing reflects the progress of intrinsic depolarization 200 through LV 28 using the conduction system of heart 6.

FIG. 5B illustrates a temporal pattern of left-ventricular activations 212A-212D (collectively "left-ventricular activations 212") in response to CSP pulse 210, e.g., delivered via electrode 34 (FIGS. 1 and 2). In the illustrated example, CSP pulse 210 is an LBBP pulse. As shown in FIG. 5B, during CSP, the time sequence of left-ventricular activations 222 is from distal-most electrode 48 to proximal-most electrode 42, similar to the time sequence in response to intrinsic depolarization 200. This timing reflects the progress of CSP pulse 210 through LV 28 using the conduction system of heart 6.

FIG. 5C illustrates a temporal pattern of left-ventricular activations 222A-222D (collectively "left-ventricular activations 222") in response to myocardial pacing pulse 220, e.g., delivered via electrode 34, but failing to capture the conduction system of heart 6, which may result in LVSP. As shown in FIG. 5C, during myocardial pacing, the time sequence of left-ventricular activations 222 is from proximal-most electrode 42 to distal-most electrode 48, in contrast to the time sequences in response to intrinsic depolarization 200 and CSP pulse 210. This timing reflects the progress of CSP pulse 210 through LV 28 from the intraventricular septum through myocardial tissue of heart 6.

FIGS. 5B and 5C also illustrate examples of left-ventricular activation metrics 122 that may be determined by processing circuitry 102 to distinguish between CSP and myocardial pacing, e.g., between LBBP and LVSP. For example, processing circuitry 102 may determine one or more intervals respectively associated with of activations 212, 222 to determine whether an electrical stimulation resulted in CSP or myocardial pacing. Processing circuitry 102 may compare the intervals to a threshold or other criteria to determine whether an electrical stimulation resulted in CSP or myocardial pacing. Example intervals include intervals between the electrical stimulation and detection of the left-ventricular activations 212, 222 via the electrode, such as intervals 214, 224 between electrical stimulations 210, 220 and sensing of left-ventricular activations 212D, 222D via electrode 48. As illustrated in FIGS. 5B and 5C, interval 212D resulting from CSP may be shorter than interval 222D resulting from myocardial pacing. Example intervals may include intervals between detections of left-ventricular activations 212, 222 via two different electrodes, such as intervals 216, 226 between detection left-ventricular activations 212D, 222D detected via electrode 48 and left-ventricular activations 212A, 222A detected via electrode 42. The order of left-ventricular activations 212A, 212D is opposite the order of left-ventricular activations 222A, 222D, which may result in interval 216 having a different sign than interval 226. As discussed above, electrode 42 may be a proximal-most electrode on lead 16, and electrode 48 may be a distal-most electrode on lead 16.

Figure 6A:
FIGS. 6A and 6B are conceptual diagrams illustrating left-ventricular activation waveforms.
Figure 6B:
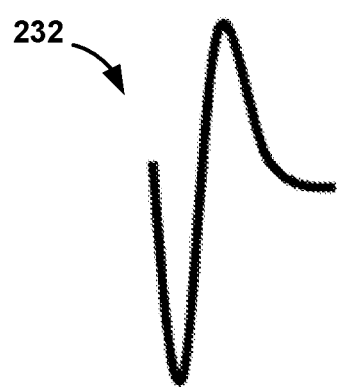

FIGS. 6A and 6B are conceptual diagrams respectively illustrating left-ventricular activation waveforms 230 and 232. Sensing circuitry 104 senses left-ventricular activation waveforms 230 and 232 via two of the electrodes of LV lead 16, e.g., electrodes 42 and 48, acting as a bipolar pair. With electrode 48 selected as the positive electrode and electrode 42 the negative electrode, the polarity of left-ventricular activation 230 being positive first indicates that the free wall of LV 28 depolarized prior to the posterior LV due to successful CSP. The polarity of left-ventricular activation 232 being negative first (opposite that of left-ventricular activation 230) indicates that the posterior of LV 28 depolarized prior to the free wall due to myocardial pacing. Processing circuitry 102 may determine various morphological left-ventricular activation metrics to distinguish between CSP and myocardial pacing on this basis. For example, processing circuitry 102 may compare left-ventricular activations to morphological templates, e.g., using wavelet decomposition.

Figure 7A:
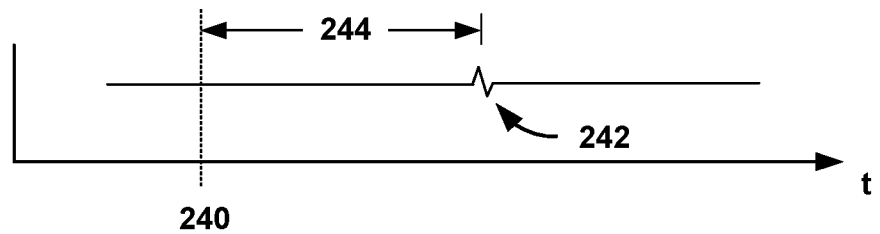
FIGS. 7A and 7B are timing diagrams illustrating sensing of left-ventricular activation.
Figure 7A:
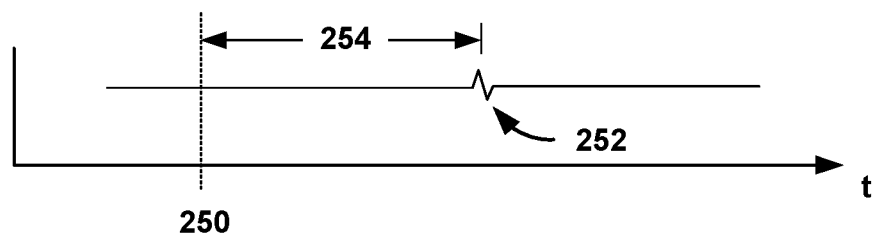
Figure 7B:
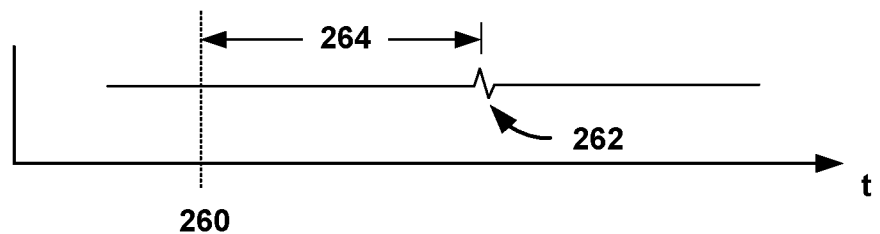
Figure 7B:
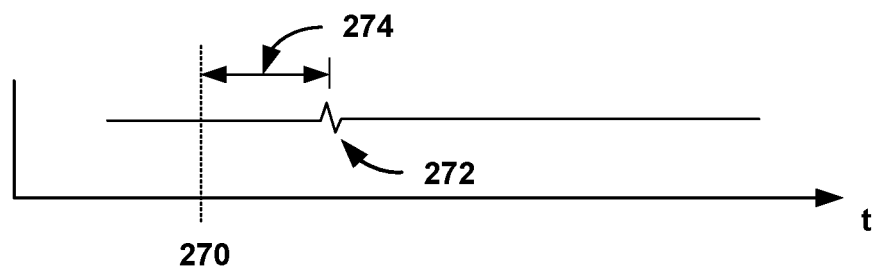

FIGS. 7A and 7B are timing diagrams illustrating sensing of left-ventricular activations. As illustrated in FIG. 7A, processing circuitry 102 may determine an interval 244 between delivery of a pacing pulse 240 by therapy delivery circuitry 106 via an electrode of LV lead 16, e.g., electrode 48, and sensing of an LV activation 242 by sensing circuitry 104 via electrode 34 of RV lead 12. Processing circuitry 102 may also determine an interval 254 between delivery of a pacing pulse 250 by therapy delivery circuitry 106 via electrode 34 and sensing of left-ventricular activation 252 via electrode 48. As illustrated in FIG. 7A, intervals 244, 254 are the same, or within a threshold degree of similarity, indicating that both pacing pulses 240 and 250 traversed LV 28 via myocardial tissue rather than the conduction system, and that pacing pulse 250 did not result in CSP.

As illustrated by FIG. 7B, processing circuitry 102 may similarly determine an interval 264 between delivery of a pacing pulse 260 by therapy delivery circuitry 106 via an electrode of LV lead 16, e.g., electrode 48, and sensing of an LV activation 262 by sensing circuitry 104 via electrode 34 of RV lead 12. Processing circuitry 102 may also determine an interval 274 between delivery of a pacing pulse 270 by therapy delivery circuitry 106 via electrode 34 and sensing of left-ventricular activation 272 via electrode 48. As illustrated in FIG. 7B, interval 274 is significantly shorter than interval 264, indicating that pacing pulse 270 captured the conduction system and resulted in CSP. Processing circuitry 102 may determine a difference or other metric of comparison between intervals, compare the metric to a threshold or other criterion, and determine whether the pacing pulse delivered via electrode 34 resulted in CSP based on the comparison. For example, processing circuitry 102 may determine that the pacing pulse resulted in LBBP capture if interval 274 is less (or less by at least a threshold amount) than interval 264.

Figure 8:
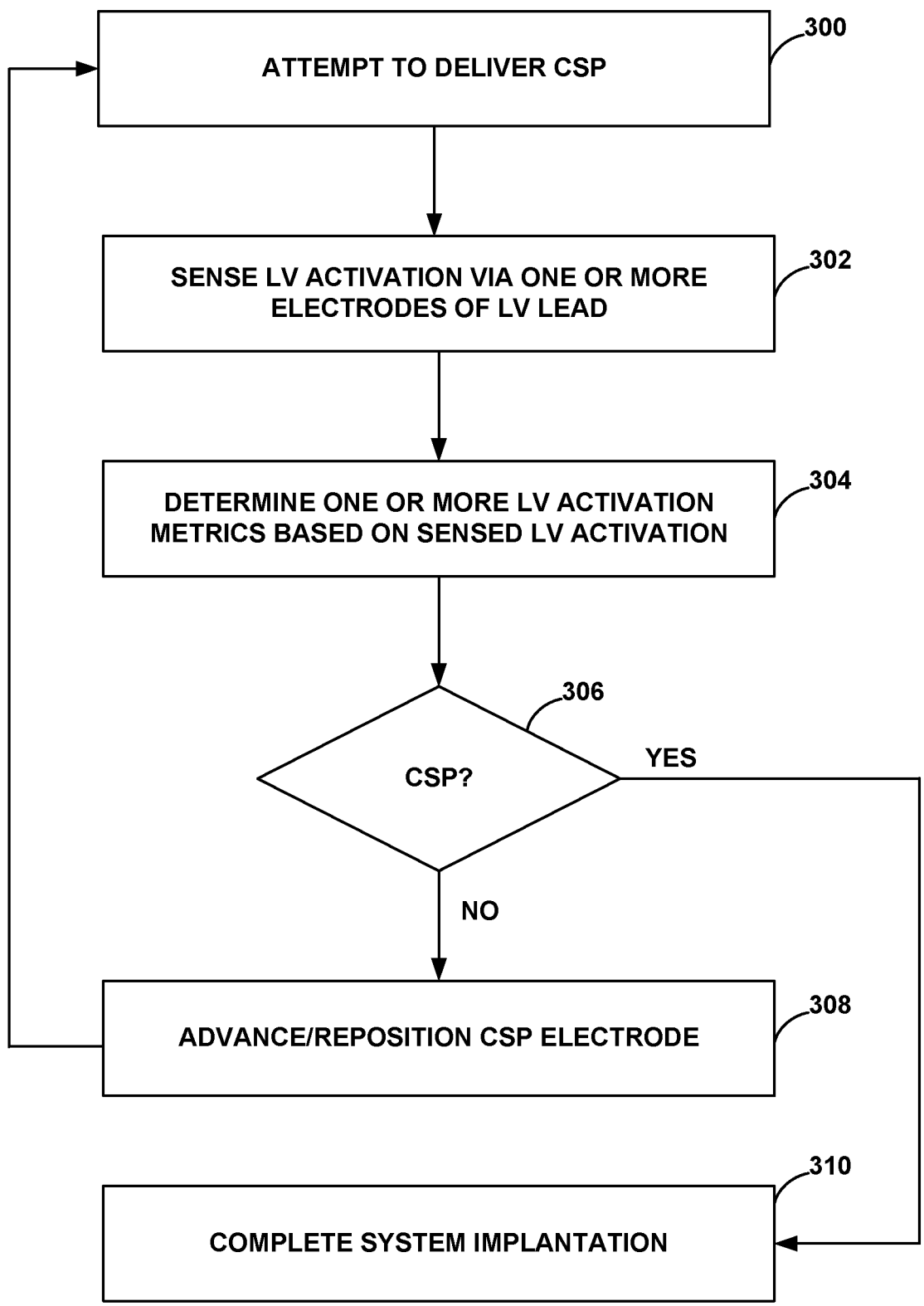
FIG. 8 is a flow diagram illustrating an example technique for differentiating conduction system and myocardial pacing according to the techniques of this disclosure during implantation of a system for delivering conduction system pacing.

FIG. 8 is a flow diagram illustrating an example technique for differentiating conduction system and myocardial pacing according to the techniques of this disclosure during implantation of a system for delivering conduction system pacing. The example technique of FIG. 8 is described as being performed by medical device system 2 including IMD 4. In some examples, the technique of FIG. 8 may be performed by other systems including other devices. For example, the techniques of FIG. 8 may be performed by an external diagnostic device, such as a pacing system analyzer (PSA) coupled to leads 12, 14, 16 during their implantation and prior to their being coupled to IMD 4.

According to the example of FIG. 8, IMD 4 attempts to deliver CSP, e.g., processing circuitry 102 controls therapy delivery circuitry 106 to deliver an electrical stimulation via electrode 34 (300). Electrical stimulation delivered via electrode 34 positioned as illustrated in FIGS. 1 and 2 may be referred to as septal pacing. Processing circuitry 102 controls sensing circuitry 104 to sense left-ventricular activation(s) via one or more of electrodes 42, 44, 46, and 48 of LV lead 16 (302). Processing circuitry 102 determines one or more left-ventricular activation metrics 122 based on the sensed left-ventricular activations (304).

Processing circuitry 102 determines whether the electrical stimulation provided CSP (306). If the electrical stimulation did not provide CSP (NO of 306), processing circuitry 102 may provide an indication of the lack of CSP to an implanting clinician, e.g., via communication with external device 8. The clinician may advance or reposition electrode 34 in an attempt to facilitate CSP via electrode 34 (308), and processing circuitry 102 may again attempt to deliver CSP (300). If the electrical stimulation resulted in CSP (YES of 306), processing circuitry 102 may provide an indication of successful CSP to the implanting clinician, who may compete implantation of medical device system 2 (310). Completion of the implantation of medical device system 2 may include fixing lead 12 and determining an atrioventricular delay for delivery of CSP, e.g. LBBP, via electrode 34. In some examples, if the clinician is unable to achieve CSP despite advancing electrode 34 and repositioning lead, the clinician may determine parameters, such as atrioventricular delays and/or interventricular delays, for delivery of CRT using electrode 34 and/or one or more of electrodes 42, 44, 46, and 48 of LV lead 16.

Figure 9:
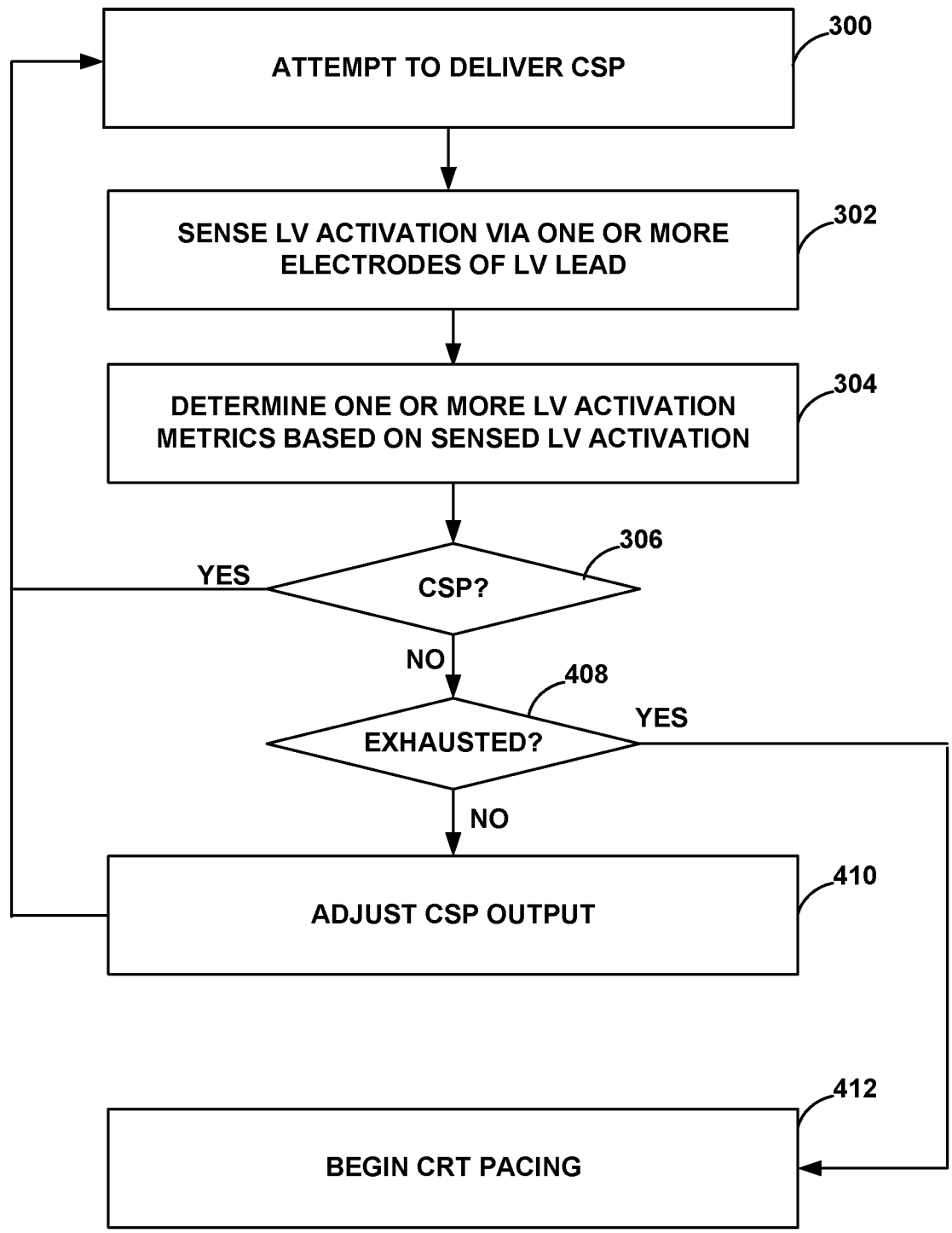
FIG. 9 is a flow diagram illustrating an example technique for differentiating conduction system and myocardial pacing according to the techniques of this disclosure during delivery of a cardiac pacing therapy.

FIG. 9 is a flow diagram illustrating an example technique for differentiating conduction system and myocardial pacing according to the techniques of this disclosure during delivery of a cardiac pacing therapy. The example technique of FIG. 9 is described as being performed by medical device system 2 including IMD 4. In some examples, the technique of FIG. 9 may be performed by other systems including other devices.

According to the example of FIG. 8, IMD 4 attempts to deliver CSP, e.g., processing circuitry 102 controls therapy delivery circuitry 106 to deliver an electrical stimulation via electrode 34 (300). Processing circuitry 102 controls sensing circuitry 104 to sense left-ventricular activation(s) via one or more of electrodes 42, 44, 46, and 48 of LV lead 16 (302). Processing circuitry 102 determines one or more left-ventricular activation metrics 122 based on the sensed left-ventricular activations (304).

Processing circuitry 102 determines whether the electrical stimulation provided CSP (306). If the electrical stimulation provides CSP (YES of 306), processing circuitry 102 may control therapy delivery circuitry 106 to continue to deliver electrical stimulation via electrode 34 without adjustment. If the electrical stimulation did not result in CSP (NO of 306), processing circuitry 102 determines whether adjustments to the magnitude of the electrical stimulation delivered via electrode 34 are exhausted (408).

If processing circuitry 102 determines that adjustments are not exhausted (NO of 408), processing circuitry 102 may control therapy delivery circuitry 106 to increase the magnitude of the electrical stimulation delivered via electrode 34, e.g., by increasing one or both of pulse amplitude and pulse width (410). If processing circuitry 102 determines that adjustments are exhausted (YES of 408), processing circuitry 102 may control therapy delivery circuitry 106 to begin CRT pacing, e.g., septal pacing via electrode 34 in fusion with pacing via one or more electrodes of LV lead 16 (412). The example technique of FIG. 9 may be performed continuously or periodically, e.g., every N hours and/or daily at a particular time of day.

In the example techniques of FIGS. 8 and 9, the LV activation metrics may be, as examples, any one or more of the LV activation metrics described above with respect to FIGS. 5A-7B. The criteria, e.g., interval thresholds, interval difference thresholds, or morphological templates, used to determine whether an electrical stimulation resulted in CSP or myocardial pacing, e.g., LBBP or LVSP, may be preprogrammed into a memory of a device, such as IMD 4. In patients with sinus rhythm and atrioventricular conduction, the values may be determined, e.g. by processing circuitry 102, based on intervals and waveform morphologies collected from the patient using electrode 34 and electrodes of LV lead 16, e.g., using the techniques described above with respect to FIGS. 5A-7B, but without delivering pacing via electrode 34. For examples, the intervals may be between activation sensed at electrode 34 and activation sensed one, two, or more of electrodes 42, 44, 46, 48 of LV lead 16.

Various aspects of the techniques may be implemented within one or more processors, including one or more microprocessors, DSPs, ASICs, FPGAs, or any other equivalent integrated or discrete logic circuitry, as well as any combinations of such components, embodied in programmers, such as physician or patient programmers, electrical stimulators, or other devices. The term "processor" or "processing circuitry" may generally refer to any of the foregoing logic circuitry, alone or in combination with other logic circuitry or any other equivalent circuitry.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media forming a tangible, non-transitory medium. Instructions may be executed by one or more processors, such as one or more DSPs, ASICs, FPGAs, general purpose microprocessors, or other equivalent integrated or discrete logic circuitry. Accordingly, the terms "processor" or "processing circuitry" as used herein may refer to one or more of any of the foregoing structures or any other structure suitable for implementation of the techniques described herein.

In addition, in some aspects, the functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements. The techniques of this disclosure may be implemented in a wide variety of devices or apparatuses, including an IMD, an external programmer, a combination of an IMD and external programmer, an integrated circuit (IC) or a set of ICs, and/or discrete electrical circuitry, residing in an IMD and/or external programmer.

In addition, the functions and techniques described in this disclosure may be provided by a medical device system that includes a plurality of IMDs. In some such examples, an IMD that may be controlled by processing circuitry to deliver ventricular pacing may not include the sensing electrodes by which the processing circuitry acquires electrograms. For example, some such medical device systems may include a leaded IMD that includes one or more intravascular leads or an extravascular ICD may include electrodes that form the first and second electrode vectors in combination with an LPD configured to be placed on or within the left ventricle and deliver ventricular pacing thereto.

In some such examples, processing circuitry of the medical device system (e.g., processing circuitry of the leaded IMD or extravascular IMD) may control the LPD to deliver ventricular pacing at a series of A-LV delays. The leaded IMD or extravascular IMD may detect pacing pulses delivered by LPD and the resulting ventricular activation in electrodes acquired by the processing circuitry from the first and second electrode vectors. The processing circuitry then may determine an updated value of a CRT parameter according to the techniques described herein and control the LPD to deliver LV pacing at the updated value of the CRT parameter to provide CRT.

Various aspects of the disclosure have been described. These and other aspects are within the scope of the following claims.

What is claimed is:

1. A method for determining, by a medical device coupled to a plurality of leads including a first lead, the first lead comprising a left-ventricular lead, and configured to deliver left-ventricular pacing via the left-ventricular lead, whether electrical stimulation provided conduction system pacing, the method comprising:
   sensing, by the medical device, two or more left-ventricular activations via two or more electrodes of a plurality of electrodes of the left-ventricular lead, wherein each of the two or more left-ventricular activations are in response to delivery of an electrical stimulation to a heart of a patient by a second lead of the plurality of leads different from the left-ventricular lead;
   determining, by the medical device, one or more left-ventricular activation metrics based on the sensed two or more left-ventricular activations, wherein determining the one or more left-ventricular activation metrics comprises comparing the two or more left-ventricular activations to each other;
   determining, by the medical device, that the electrical stimulation did not provide conduction system pacing (CSP) based on the one or more ventricular activation metrics; and
   in response to determining that the electrical stimulation did not provide CSP, delivering subsequent electrical stimulation having at least one of an increased pulse amplitude or an increased pulse width based on the determination that the electrical stimulation did not provide conduction system pacing.

2. The method of claim 1, wherein determining the one or more left-ventricular activation metrics comprises comparing an interval between the delivery of the electrical stimulation and the sensing of each left-ventricular activation of the two or more left-ventricular activations.

3. The method of claim 2, wherein sensing each left-ventricular activation comprises sensing one of the two or more left-ventricular activations via a distal-most electrode of the plurality of electrodes of the left-ventricular lead.

4. The method of claim 1, wherein comparing the two or more left-ventricular activations comprises determining one or more respective intervals between the two or more left-ventricular activations.

5. The method of claim 1, wherein the two of the two or more electrodes comprise a proximal-most electrode and a distal-most electrode of the plurality of electrodes of the left-ventricular lead.

6. The method of claim 1, wherein determining the one or more left-ventricular activation metrics comprises determining a morphology of at least one left-ventricular activation of the two or more left-ventricular activations.

7. The method of claim 6, wherein the two or more electrodes comprise a proximal-most electrode and a distal-most electrode of the plurality of electrodes of the left-ventricular lead.

8. The method of claim 1, wherein the electrical stimulation comprises a first electrical stimulation delivered via a CSP electrode on the second lead of the plurality of leads, wherein the second lead is configured so that the CSP electrode may be positioned in the intraventricular septum or the atrioventricular septum,
wherein sensing the two or more left-ventricular activations comprises:
sensing a first activation via the plurality of electrodes of the left-ventricular lead in response to delivery of the first electrical stimulation; and
sensing a second activation via the CSP electrode in response to delivery of a second electrical stimulation via the one or more electrodes of the plurality of electrodes of the left-ventricular lead,
wherein comparing the two or more left-ventricular activations comprises:
determining a first activation interval of the first activation;
determining a second activation interval of the second activation; and
comparing the first activation interval to the second activation interval.

9. The method of claim 8, wherein sensing the first activation and delivering the second electrical stimulation comprises sensing the first activation and delivering the second electrical stimulation via a distal-most electrode of the left-ventricular lead.

10. The method of claim 1, wherein determining the electrical stimulation did not provide CSP comprises determining the electrical stimulation did not provide left bundle branch pacing.

11. The method of claim 1, wherein determining the electrical stimulation did not provide conduction system pacing comprises determining the electrical stimulation did not provide conduction system or myocardial pacing.

12. The method of claim 1, further comprising, in response to determining the electrical stimulation did not provide conduction system pacing, adjusting a position of an electrode used to deliver the electrical stimulation based on the determination that the electrical stimulation did not provide CSP.

13. A system comprising:
a plurality of leads comprising a first lead, the first lead comprising a left-ventricular lead, and a second lead, the second lead being different from the left-ventricular lead;
an implantable medical device coupled to the plurality of leads and configured to deliver left-ventricular pacing via the left-ventricular lead, the implantable medical device comprising:
sensing circuitry,
therapy delivery circuitry, and
processing circuitry configured to:
sense, using the sensing circuitry, two or more left-ventricular activations via two or more electrodes of the left-ventricular lead, wherein each of the two or more left-ventricular activations are in response to delivery of an electrical stimulation to a heart of a patient by the second lead of the plurality of leads;
determine one or more left-ventricular activation metrics based on the sensed one or more left-ventricular activations, wherein to determine the one or more left-ventricular activation metrics, the processing circuitry is configured to compare the two or more left-ventricular activations to each other;
determine the electrical stimulation provided conduction system pacing (CSP) based on the one or more ventricular activation metrics; and
in response to determining the electrical stimulation provided CSP, control the therapy delivery circuitry to deliver subsequent electrical stimulation via a CSP electrode on the second lead of the plurality of leads, wherein the CSP electrode is configured to be positioned in the intraventricular septum or the atrioventricular septum.

14. The system of claim 13, wherein the implantable medical device comprises an implantable pacemaker configured to be coupled to the left-ventricular lead and the second lead of the plurality of leads, the implantable pacemaker comprising the sensing circuitry and the processing circuitry, and further comprising therapy delivery circuitry configured to deliver the electrical stimulation via the second lead.

15. The system of claim 13, wherein the implantable medical device comprises an implantable pacemaker configured to be coupled to the plurality of leads, the implantable pacemaker comprising the sensing circuitry, the therapy delivery circuitry, and the processing circuitry.

16. An implantable medical device comprising:
a means for sensing two or more left-ventricular activations via two or more electrodes of a first lead comprising a left-ventricular lead positioned within a coronary sinus, wherein each of the two or more left-ventricular activations are in response to delivery of an electrical stimulation to a heart of a patient by a second lead of a plurality of leads, the second lead being different from the left-ventricular lead;
a means for determining one or more left-ventricular activation metrics based on the sensed two or more left-ventricular activations, wherein determining the one or more left-ventricular activation metrics comprises comparing the two or more left-ventricular activations;

a means for determining the electrical stimulation did not provide conduction system pacing (CSP) based on the one or more ventricular activation metrics; and a means for, in response to determining the electrical stimulation did not provide CSP, delivering subsequent electrical stimulation having at least one of an increased pulse amplitude or an increased pulse width based on the determination that the electrical stimulation did not provide conduction system pacing.

17. A method for determining, by a medical device coupled to a plurality of leads including a first lead, the first lead comprising a left-ventricular lead, and configured to deliver left-ventricular pacing via the left-ventricular lead, whether electrical stimulation provided conduction system pacing, the method comprising:

sensing, by the medical device, two or more left-ventricular activations via two or more electrodes of a plurality of electrodes of the left-ventricular lead, wherein each of the two or more left-ventricular activations are in response to delivery of an electrical stimulation to a heart of a patient by a second lead of the plurality of leads different from the left-ventricular lead;

determining, by the medical device, one or more left-ventricular activation metrics based on the sensed two or more left-ventricular activations, wherein determining the one or more left-ventricular activation metrics comprises comparing the two or more left-ventricular activations to each other;

determining, by the medical device, that the electrical stimulation did not provide conduction system pacing (CSP) based on the one or more ventricular activation metrics; and in response to determining that the electrical stimulation did not provide CSP, delivering subsequent electrical stimulation via the left-ventricular lead based on the determination that the electrical stimulation did not provide conduction system pacing.

18. The method of claim 17, wherein determining the one or more left-ventricular activation metrics comprises comparing an interval between the delivery of the electrical stimulation and the sensing of each left-ventricular activation of the two or more left-ventricular activations.

19. The method of claim 18, wherein sensing each left-ventricular activation comprises sensing one of the two or more left-ventricular activations via a distal-most electrode of the plurality of electrodes of the left-ventricular lead.

20. A system comprising:

a plurality of leads comprising a first lead, the first lead comprising a left-ventricular lead, and a second lead, the second lead being different from the left-ventricular lead;

an implantable medical device coupled to the plurality of leads and configured to deliver left-ventricular pacing via the left-ventricular lead, the implantable medical device comprising:

sensing circuitry, therapy delivery circuitry, and processing circuitry configured to:

sense, using the sensing circuitry, two or more left-ventricular activations via two or more electrodes of the left-ventricular lead, wherein each of the two or more left-ventricular activations are in response to delivery of an electrical stimulation to a heart of a patient by the second lead of the plurality of leads;

determine one or more left-ventricular activation metrics based on the sensed one or more left-ventricular activations, wherein to determine the one or more left-ventricular activation metrics, the processing circuitry is configured to compare the two or more left-ventricular activations to each other;

determine the electrical stimulation did not provide conduction system pacing (CSP) based on the one or more ventricular activation metrics; and in response to determining the electrical stimulation did not provide CSP, control the therapy delivery circuitry to deliver subsequent electrical stimulation via the left-ventricular lead.

* * * * *